United States Patent Office 2,723,570
Patented Nov. 15, 1955

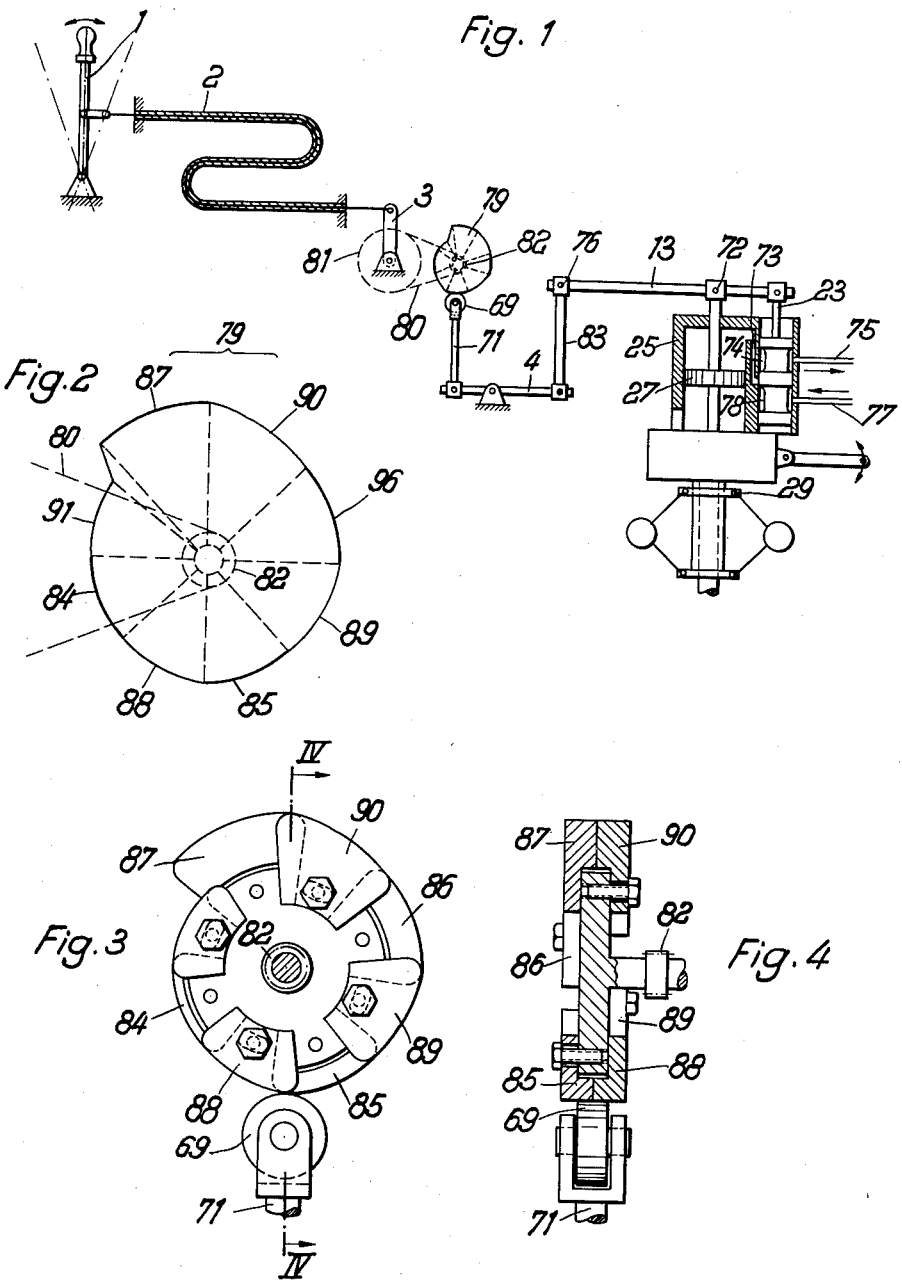

2,723,570

REMOTE CONTROL MECHANISMS, ESPECIALLY FOR VEHICLES WITH FLUID DRIVE

Heinrich Herrmann, Kettwig, Germany, assignor to Fried. Krupp Locomotivfabrik, Essen, Germany Original application November 6, 1950, Serial No. 194,305, now Patent No. 2,668,455, dated February 9, 1954. Divided and this application August 6, 1952, Serial No. 302,979

Claims priority, application Germany November 23, 1949

4 Claims. (Cl. 74—491)

The present invention relates to remote control mechanisms, and although not limited to, is of particular advantage for use in connection with fluid drives.

Prior to the present invention, a remote control mechanism had been suggested which was developed particularly for use in connection with vehicles in which the power transmission is effected by means of a fluid drive. In this known device, the receiver side comprises adjusting elements for a precise adjustment of individual control values, whereas a precise adjustment is not required at the transmitter side. According to this known remote control mechanism, a pressure controlled adjusting element at the receiver side is adjusted from the transmitter side by effecting a change in pressure of the fluid pressure means, while for instance, compressed air or water under pressure was used as fluid pressure means. This arrangement is, however, vulnerable in several respects. Thus, the transmitting means which generally consists of rubber hoses and convey the pressure fluid means from one vehicle to another vehicle may relatively easily be damaged. Furthermore, difficulties are frequently encountered when connecting or disconnecting said hoses, particularly when liquids are used as pressure fluid means.

It is, therefore, an object of the present invention to provide a remote control mechanism which will overcome the above-mentioned drawbacks.

It is another object of the present invention to provide a remote control mechanism in which the remote control is effected by purely mechanical means.

It is a still further object of this invention to provide a remote control mechanism which allows to be effected a relatively great number of precisely controlled strokes or adjustments, and which, on the other hand, is relatively simple in construction and operation and easy to handle.

These and other objects and advantages of the invention will appear more clearly from the following specification in connection with the acompanying drawings in which:

Figure 1 illustrates in a diagrammatic manner an embodiment of the present invention.

Figure 2 illustrates on a somewhat larger scale than Figure 1 a detail of a structural element used in the arrangement of Figure 1.

Figure 3 and Figure 4 illustrate adjusting means for adjusting the cam sectors of Figure 2; Figure 3 is a view of this means, and Figure 4 is a section along the line IV—IV of Figure 3.

General arrangement

As indicated above, the present invention relates to remote control mechanisms adapted at the receiver side to effect precise adjustments, whereas no corresponding precise control movements are required at the transmitter side. While devices of this general character have been known heretofore, the present invention differs from the heretofore known devices of this type in that the transmitter and the receiver are connected with each other by a stroke control mechanism and by means cooperating therewith, which means are constructed and arranged so that they will remain stationary within the range of precise control values, event if the stroke control mechanism continues to move. Other solutions to this problem are disclosed in my co-pending application, Serial No. 194,305, filed November 6, 1950, now Patent No. 2,668,455, and of which this present case is a division.

Structural arrangement

Referring to the drawings in detail, and Figure 1 thereof in particular, the construction shown therein comprises a transmitter in form of an adjusting lever 1 which is connected by means of a flexible control wire 2 with a second lever 3 on the receiver side. The shifting movement of this lever 3 is transformed into a rotation of a cam disc 79. For this purpose there is provided an endless belt 80, for instance, a chain passed around two sprocket wheels 81, 82, whereby the lever 3 is pivotally connected with the sprocket wheel 81, whereas the cam disc 79 is rigidly connected with the shaft of the sprocket wheel 82, the radius of which being minor than that of the sprocket wheel 81. The flexible control wire 2 is used for the purpose of transmitting the control stroke from the transmitter to the receiver side.

When shifting the adjusting lever 1 the cam disc 79 rolls on the roller 69. The movement of the roller 69 is conveyed to the receiver lever or control member 13. For this purpose the rod 71 which supports the roller 69 is directly pivotally connected with the two-arm lever 4 which, in its turn, merely by means of the rod 83 is connected with control members 13, 23 of the receiver. The latter is represented by an amplifier 25, the working piston 27 of which being connected by spring means (not shown in the drawing), with a governor sleeve 29 pertaining to a motor (also not shown in the drawing). The forces transmitted through the control member 13 are amplified in the following manner by the amplifier piston 27 of the cylinder 25 which is open at the bottom:

When, by turning the adjusting lever 1 clockwise, the cam disc 79 is rotated in the same sense, the roller 69 moves downwardly with regard to Figure 1 and the control member 13 likewise rotates clockwise about its pivot 72, which latter is provided at the free end of the rod pertaining to the amplifier piston 27. As a result thereof, the control spool 23 move downwardly with regard to Figure 1 so that pressure fluid may escape from the space above the amplifier piston 27 through channel 73 and annular chamber 74 of the spool into a discharge conduit 75. The spring effect between the working piston 27 and the governor sleeve 29 presses the piston 27 upwardly. In this way, the control member 13 is rotated around the pivot 76 on the rod 83 in anticlockwise direction, and the spool 23 is returned upwardly. When the adjusting lever 1 is rotated in opposite direction, opposite movements will be effected. When the spool 23 is moved upwardly, pressure fluid flows from an inlet conduit 77 through a second annular chamber 78 and the channel 73 into the space above the working piston 27, thus effecting a return of the same downwardly.

The element which, according to the present invention, cooperates with the stroke control means 2 and which, within the range of definite control values will not adjust the receiver 23 even when the control adjustment is moved further or the transmission lacks precision, is provided in a particularly simple manner by giving a corresponding shape to the cam area pertaining to the cam disc 79.

According to the present invention, the cam area is provided with a plurality of sectors, for instance, four sectors 84, 85, 86, 87 (see Figure 2) with the same radii within the respective sector, which four sectors may correspond to idling, three-quarter load, full load and overload in correspondence with four definite positions of a motor to be controlled. Between each two of these sectors there is provided a sector 88, 89, 90 and 91 respectively with gradually changing radii within the respective sector. The sectors or a portion thereof may be made adjustable (see Figures 3 and 4).

As long as the roller 69 is within the range of the sectors 84 to 87, i. e., within the range of the precisely to be adjusted controlling values, the receiver member 13 remains stationary in spite of the movement of the adjusting lever 1. Theoretically, on the shaft of the cam disc 79 any desired number of cam discs may be arranged spaced from each other so that one lever 1 will be adapted to control a plurality of receivers simultaneously according to the same or different laws.

It is, of course, understood that the present invention is by no means limited to the particular structures shown in the drawings but, also, comprises any modifications within the scope of the appended claims.

What I claim is:

1. A remote control arrangement comprising in combination, transmitter means including adjustable means operable to produce adjusting impulses, receiver means, controlling means adapted for being associated with said receiver means for effecting a precise adjustment thereof for each adjusting impulse directed to said receiver means from said adjustable means via said controlling means, stroke control means interposed between said transmitter means and said controlling means, and cam disc means interposed between and operatively connected with said stroke control means and said controlling means and provided with a plurality of sectors having different radii corresponding to the different precise adjustments to be effected by said controlling means and each sector having the same radius throughout its effective cam area.

2. A remote control arrangement according to claim 1, which includes means for adjusting the sectors carrying the effective cam areas.

3. A remote control arrangement comprising in combination, a transmitter means including adjustable means operable to produce adjusting impulses, receiver means, controlling means adapted for being associated with said receiver means for effecting a precise adjustment for each adjusting impulse directed to said receiver means, stroke control means including flexible control wire means and chain means interposed between said transmitter means and said controlling means, and means operatively connected serially with said stroke control means and operable to absorb excessive adjusting movements of said adjustable means within predetermined limits beyond the respective exact adjusting positions thereof corresponding to the desired precise adjusted positions of said controlling means to thereby prevent transmission of said excessive adjusting movements to said receiver means and enabling a definite precise adjustment of said controlling means, and, therefore, said receiver means, without necessitating a corresponding precise adjustment of said adjustable means.

4. A remote control arrangement comprising in combination, transmitter means including an adjustable lever movable for producing adjusting impulses, receiver means, controlling means connected with said receiver means for moving said receiver means and adapted for being shifted into a plurality of precise adjusted positions, a cam disc, a follower connected with said controlling means and bearing on said cam disc, said cam disc being connected with said lever for rotation by the lever upon movement of the lever, and said cam disc comprising a plurality of spaced sectors of different radii connected by intervening cam rises, and each sector having the same radius throughout its effective cam area and serving to position said controlling means in one of its precise adjusted positions whereby said controlling means can be adjusted into said precise positions without corresponding precise adjsutment of said lever.

References Cited in the file of this patent

UNITED STATES PATENTS

| | | |
|---|---|---|
| 1,141,504 | Street | June 1, 1915 |
| 1,145,337 | Street | July 6, 1915 |
| 2,483,105 | Rennick | Sept. 27, 1949 |